June 29, 1954 R. N. KAUFFMAN 2,682,195
DIRECT PROJECTION OPTICAL SYSTEM HAVING CONTROLLED
EFFECTIVE DIAMETER OF LIGHT SOURCE
Filed Dec. 20, 1951 2 Sheets-Sheet 1
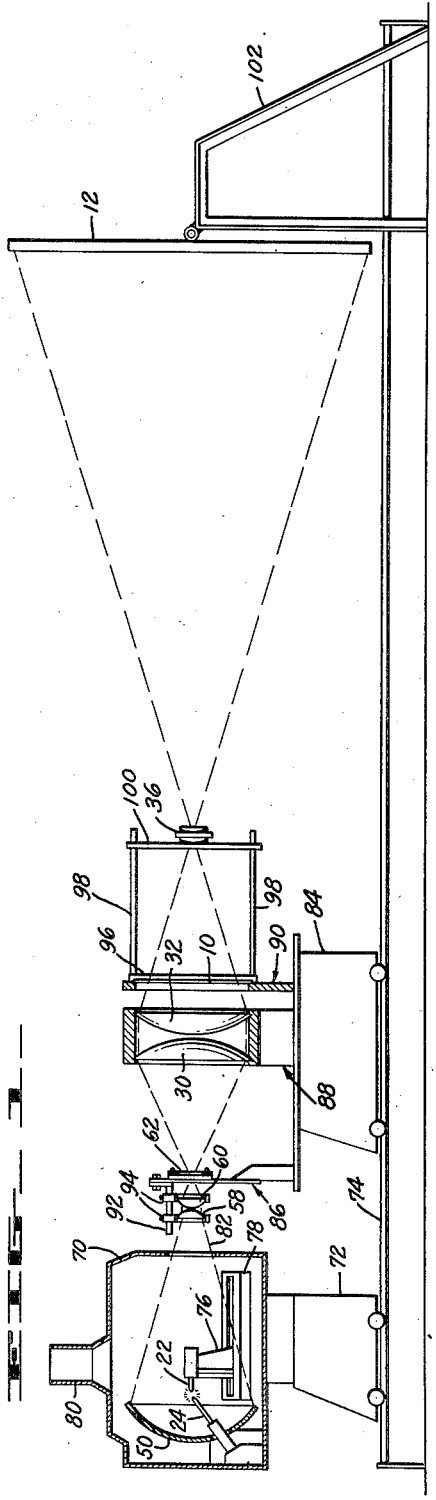
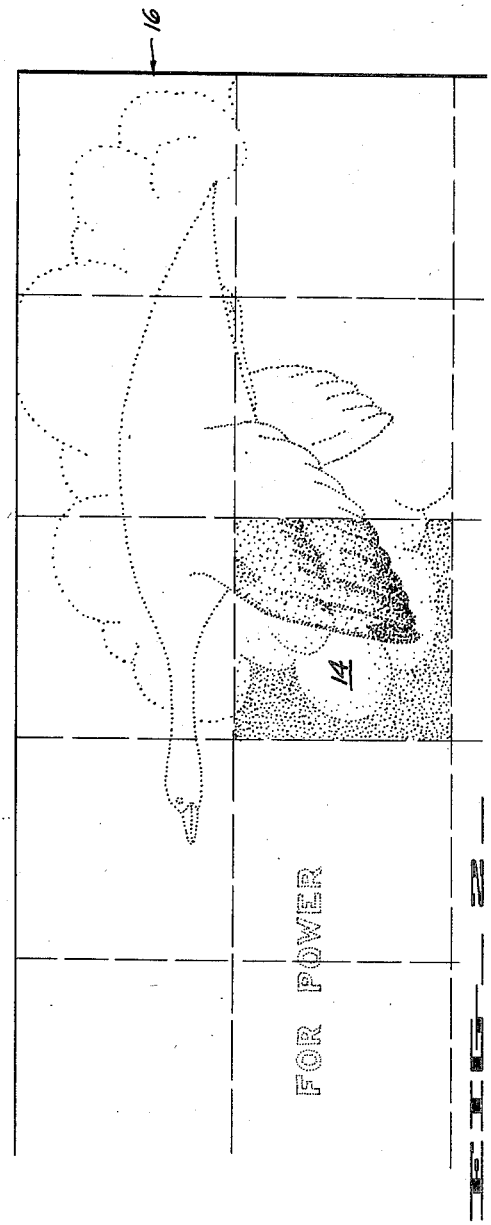
INVENTOR.
RICHARD N. KAUFFMAN
BY
ATTORNEYS.

INVENTOR.
RICHARD N. KAUFFMAN
BY
ATTORNEYS.

Patented June 29, 1954

2,682,195

UNITED STATES PATENT OFFICE 2,682,195

DIRECT PROJECTION OPTICAL SYSTEM HAVING CONTROLLED EFFECTIVE DIAMETER OF LIGHT SOURCE

Richard N. Kauffman, Hillsborough, Calif.

Application December 20, 1951, Serial No. 262,541

5 Claims. (Cl. 88—24)

1

This invention relates to optical systems, and more particularly to improvements in direct projection optical systems of the type used in the photo-lithograph industry for the enlarged reproduction of the image of a half-tone negative on a light-sensitive pressplate.

Among the objects of the present invention are the following: the provision of an optical system of the above mentioned type having a higher resolving power and greater definition than the conventional optical systems of this type; the provision of a direct projection optical system which, in comparison with conventional systems of this type, enables the use of a light source of lesser intensity without extending the exposure time required to obtain an enlarged image on the sensitized pressplate; and the provision of an optical system of the type described embodying means for gathering and concentrating the light rays from the light source, means for controlling the effective diameter of the light source, and means for preventing any relative movement between the effective light source and sensitized pressplate during operation of the system.

Other objects and advantages of the invention will be apparent from the following description taken in conjunction with the drawings forming part of this specification, and in which:

Figure 1 is a view in side elevation of the direct projection optical system of the invention, with some of the elements thereof being sectionalized for purposes of clarity;

Figure 2 is a view of a portion of a multi-sheet poster, each sheet or panel of which is adapted to be reproduced through the use of a processed pressplate which has served as the light-receiving target of the optical system of the invention;

The function of the direct projection optical system of the invention is to transmit light from a small intense light source through a half-tone negative 10 to project the enlarged image of the negative onto a pressplate 12 coated with a light-sensitive material. A bichromate-coated zinc pressplate is commonly used. After the pressplate has been processed, it is used to print a single sheet or panel 14 of a multi-sheet poster indicated generally at 16.

The marginal edges of the printed panel 14

2 constitute the critical area of the panel in the sense that there is a particular need in this area for a uniform and sharply defined half-tone dot structure in order that the panel will blend with adjacent panels, and it is in this marginal area, due to the nature of the direct projection system, that the half-tone dot structure tends to be distorted and to be lacking in definition. The following general consideration should be borne in mind: the smaller the effective light source, the greater the enlargement process lens may be stopped down, and hence the lesser the possibility of obtaining marginal distortion and lack of definition in the half-tone dot structure of the print; the more intense the effective light source, the lesser is the exposure time required; and the greater the amount of light gathered from the effective light source, the more efficient is the light source and the overall direct projection system. Thus, it is highly desirable from the standpoint of operating results as well as that of efficiency of the system that a direct projection optical system be provided with the smallest and most intense light source possible without using an excessive power input to the source.

Before proceeding to a description in detail of the direct projection system of the invention, the conventional projection systems of Figures 3 and 4 will first be described in order that the advance in the art embodied in the subject system may be more clearly understood.

Figure 3:
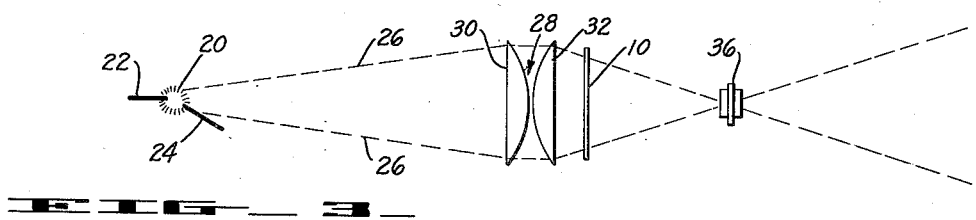
Figure 3 is a schematic view of a conventional direct projection optical system.
Figure 4:
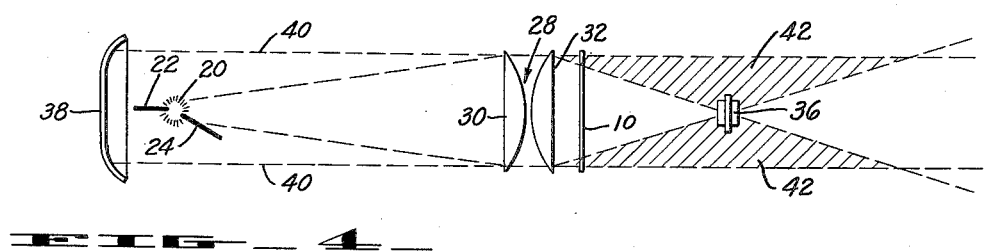
Figure 4 is a schematic view of an impractical modification of the optical system of Figure 3.

In the direct projection system of Figure 3, the light source 20 is formed between the ends of a positive carbon electrode 22 and a negative carbon electrode 24. In practice, a 150 amp. direct current high intensity carbon arc lamp is utilized, and this lamp provides a light source which is as small in size as it is possible to obtain with the conventional projection systems. A cone of light indicated by dotted lines 26 is transmitted to a condensing lens system, indicated generally at 28, and consisting of a pair of plano-convex lenses 30 and 32. The condensing lens system directs the light through the half-tone negative 10 and through a process lens 36 to a light-sensitive pressplate, such as 12 in Figure 1. In practice, the condensing lenses 30 and 32 are commonly twelve inches in diameter, and the lens 36 is commonly a fourteen inch F9 Artar process lens. The light source 20 is less than 1 inch in diameter, and hence the process lens 36 can be stopped down from F9 to F16 without diminishing the amount of light reaching the pressplate.

The projection system of Fig. 3 is inefficient in the sense that only a small portion of the light provided by source 20 is utilized in the system. It is not feasible to modify the system of Figure 3 to the extent of placing a silvered reflector 38 behind the light source, as indicated in Figure 4, to gather the light rays, because when this is done there is no longer a light source of point size. The effective diameter of the enlarged light source is defined by the distance between the boundary light rays 40. The shaded portions 42 of Figure 4 indicate the amount of light lost, i. e., the light refracted by the condensing lens system to by-pass the lens 36 and the pressplate, when the reflector 38 is employed in the manner shown. In order to minimize the light loss, the process lens 36 must be used at a wide open setting and when this is done the half-tone dot structure is distorted, particularly at the edges of the image, and, furthermore, halation is caused around the individual dots, thus producing a fogging of the pressplate. These disadvantageous results are obtained in spite of the fact that the lens 36 may be a highly corrected process lens of relatively long focal length.

Figure 5:
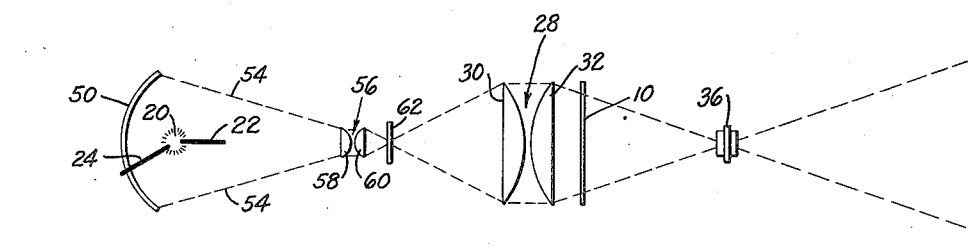
Figure 5 is a schematic view of the direct projection optical system of the present invention.

The projection system of the invention, as schematically illustrated in Figure 5, differs from the systems of Figures 3 and 4 in the following essentials: a silvered reflector 50 is employed to concentrate the light rays from light source 20, with the electrodes 22 and 24 being preferably so positiodned that the light source 20 is located a greater distance from the reflector 50 than the length of the radius of curvature of the reflector. Such placement of the electrodes causes the reflected light to be concentrated in a cone defined between border light rays 54. The apparent increase in size of the light source caused by reflector 50 light rays is then negatived through the provision of an auxiliary condensing lens system, indicated generally at 56 and comprising planoconvex condensing lenses 58 and 60, in combination with a quartz ground glass plate 62. The described placement of the electrodes with respect to the reflector enables the use of relatively small condensing lenses 58 and 60. The lenses 58 and 60 serve to focus the light on the plate 62 so that a brilliant small disk of light of about one-half inch in diameter appears on the ground glass plate. The plate 62 serves as a masking diffuser to block out the image of the primary light source 20 and its reflector system. The small disk of light on the plate 62 thus serves as the effective light source for the balance of the optical system, which system comprises the conventional condensing lens system 28, the halftone negative 10, and the process lens 36.

A more detailed embodiment of the direct projection optical system of the invention is shown in Figure 1. The light producing portion of the system comprising the positive electrode 22, the negative electrode 24, and the reflector 50 is carried within a housing 70 mounted on a wheeled carriage 72 which is movably disposed on rails 74. The positive electrode 24 is mounted on a support 76 which is slidably carried by a base member 78. Means, not shown, are provided to automatically adjust the electrode support on the base member 78 to maintain the proper spacing between the electrodes when the system is in operation. The housing is provided with a heat escape stack 80 and with a light emitting aperture 82. It will be noted that the positions of the electrodes 22 and 24 have been reversed compared with their conventional positioning (Figure 3) because of the presence of reflector 50.

The balance of the optical system is mounted on a wheeled carriage 84 which is adjustably movable on rails 74. The carriage 84 carries mounting frames indicated generally at 86, 88, and 90. Frame 86 supports the plate 62 and also carries a pair of horizontally extending rods 92 serving as guide supports for the carriers 94 for the lenses 58 and 60. The carriers 94 are adjustably slidable on rods 92 for the purpose of adjusting the position of the lenses 58 and 60 with respect to the plate 62 to thus control the diameter of the spot of light which is projected onto and diffused through the quartz ground glass plate 62.

Mounting frame 88 carries the plano-convex lenses 30 and 32, while mounting frame 90 carries the negative holder 96 and parallel horizontally extending guide rods 98 serving as a support for the slidably adjustable lens carrier 100.

The pressplate 12 is pivotally carried by a support stand 102 so that the plate may be pivoted to a horizontal position on the top of the stand for checking and processing.

In practice, a 95 amp. carbon arc light has been used as the primary light source of the system. Due to the fact that a reflector may be efficiently used in the projection system of invention, the exposure time for the pressplate is just as short as it is with the conventional projection system of Figure 3 which normally employs a 150 amp. arc light. With both systems, a length of exposure of 20–30 minutes is required due to the low sensitivity of the bichromate coating on the pressplate. Thus, with the projection system of the invention a considerable saving in current consumption is had over the relatively inefficient system of Figure 3.

The optical system of the invention is more flexible than the conventional system of Figure 3 in that it is possible to change the diameter of the spot of light on the quartz ground glass plate 62 by changing the focal length of the small quartz condensers 58 and 60 and their position relative to the ground glass plate. If it is desired, the effective light source, i. e., the spot on plate 62, can be reduced in size so that the lens 36 can be used at a setting, for example, of F32. On the other hand when the gas ball inside of the crater of the positive carbon is used as the effective light source in the conventional system of Figure 3, the size of the spot of light imaged in the process lens cannot be varied.

In the subject projection system, the image definition is improved over that obtained with the conventional system of Figure 3. This is due to the fact that the effective light source, the spot of light on the ground glass plate, is immovable, and is thus in a fixed position relative to the rest of the optical system, whereas the system of Figure 3, utilizing the crater of the positive carbon as the effective light source, is actually employing a moving light source. The high intensity carbon arc light has a rotating positive carbon electrode which constantly turns and feeds inwardly as it burns. This movement usually causes a change in the position of the gas ball light source with respect to the balance of the optical system during the relatively long exposure time of 20–30 minutes. The optical characteristics of the image on the pressplate are thus changed, producing distortion in the halftone dot structure.

From the foregoing description of the optical system of the invention and its advantages over direct projection optical systems which have been conventionally used in the art, it will be clear that I have provided a novel and efficient system enabling the obtaining of the objects above mentioned. While a specific embodiment of the invention has been shown and described, it is to be understood that all substantial equivalents of said embodiment are within the spirit and scope of the invention.

What is claimed is:

1. In a direct projection optical system having a high intensity carbon arc light source, a pair of plano-convex lenses adapted to condense the light received from the source and transmit it through a negative, and a process lens adapted to transmit the light passed through the negative to a light sensitive surface; the combination of a reflector placed behind the light source, a second pair of plano-convex lenses located between the light source and said first pair of lenses in light receiving relation to said reflector, a planar ground glass plate disposed in spaced relation to said second pair of lenses at the light output side thereof, and means adjustably mounting said second pair of lenses and said process lens for adjustable movement relative to each other.

2. A direct projection optical system comprising the following combination of elements in axial alignment: a light source, a light-concentrating reflector disposed in back of said source, means disposed in front of said source to transmit and condense the light to a narrowing beam, a planar ground glass plate to receive and transmit said narrowing beam, means disposed in light-receiving relation to said diffuser means to transmit and condense the light to a narrowing beam, a negative disposed in light receiving relation to said latter means, a process lens disposed at the light output side of said negative, and means adjustably mounting said process lens for movement toward and away from said negative.

3. In a direct projection optical system having a light source and a condensing lens system, the provision of a planar ground glass plate between said source and lens system in combination with reflector means associated with said source in light gathering relation therewith and means adjustably disposed between said lens system and said glass plate for condensing said reflected light onto said plate as a small disk of light.

4. In a direct projection optical system having a light source, a reflector disposed in light gathering relation therewith, and a condensing lens system in light receiving relation to said reflector; the combination therewith of a planar ground glass plate disposed between said lens system and said light source, and means adjustably mounted between said lens system and said glass plate for condensing the light transmitted from said reflector onto said plate in the form of a relatively small disk of light, whereby said disk of light on said plate serves as the effective light source for said condensing lens system.

5. In combination, a light source of high intensity, a reflector for said light source, a pair of plano-convex lenses constituting a condensing lens system disposed in light receiving relation to said reflector, a planar ground glass plate disposed in light receiving relation to said condensing lens system, and means for mounting said lenses for adjustable movement toward and away from said light source and said glass plate.

References Cited in the file of this patent

UNITED STATES PATENTS

| Number | Name | Date |
|---|---|---|
| 1,143,287 | Kohler | June 15, 1915 |
| 1,630,616 | Hill | May 31, 1927 |
| 1,709,017 | Hill | Apr. 16, 1929 |
| 1,750,910 | Stark | Mar. 18, 1930 |
| 2,123,830 | Groesbeck | July 12, 1938 |
| 2,190,294 | Mili | Feb. 13, 1940 |
| 2,510,419 | Ross | June 6, 1950 |